E. C. BASSETT.
CONTROLLING DEVICE FOR SEWING MACHINES.
APPLICATION FILED APR. 14, 1915.
1,147,670.
Patented July 20, 1915.
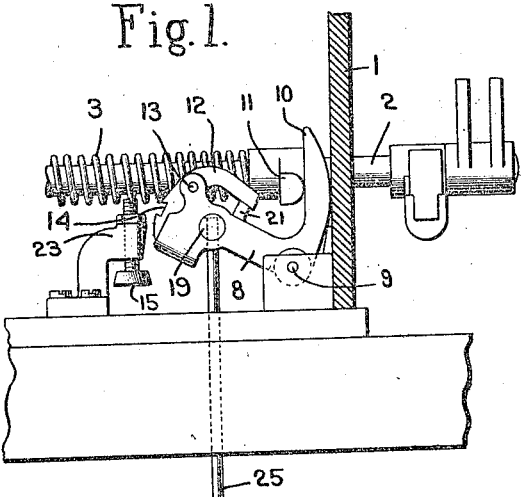
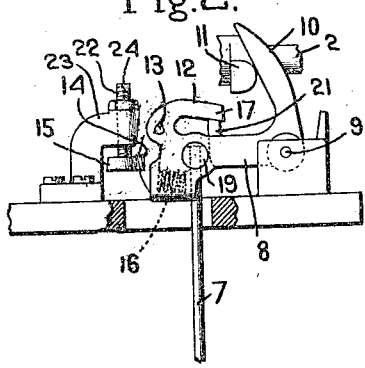
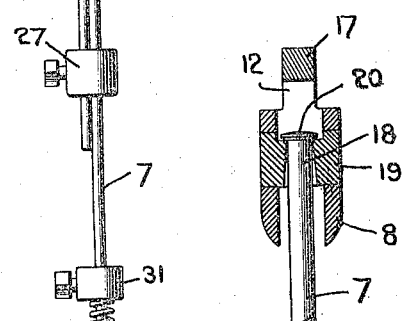
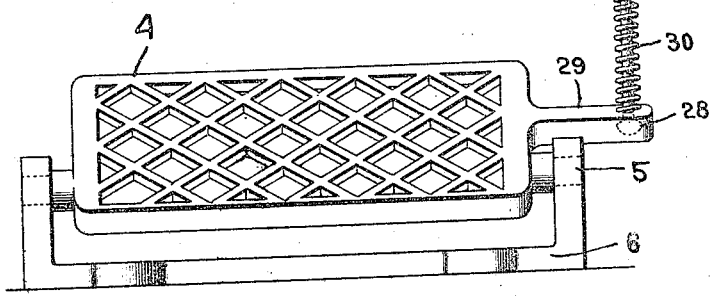
Inventor
Elmer C. Bassett,
by Heard Smith & Tennant.
Atty's.

UNITED STATES PATENT OFFICE.

ELMER C. BASSETT, OF MILTON, MASSACHUSETTS, ASSIGNOR TO THE REECE BUTTON HOLE MACHINE COMPANY, OF BOSTON, MASSACHUSETTS, A CORPORATION OF MAINE.

CONTROLLING DEVICE FOR SEWING-MACHINES.

1,147,670.

Specification of Letters Patent.

Patented July 20, 1915.

Application filed April 14, 1915. Serial No. 21,439.

*To all whom it may concern:*

Be it known that I, ELMER C. BASSETT, a citizen of the United States, residing at Milton, county of Norfolk, State of Massachusetts, have invented an Improvement in Controlling Devices for Sewing Machines, of which the following description, in connection with the accompanying drawing, is a specification, like characters on the drawing representing like parts.

This invention relates to controlling mechanism for controlling the starting and stopping of a machine and particularly to mechanism which is actuated by a treadle.

Many machines such as power-actuated sewing machines are provided with a clutch or a belt shifter or other equivalent means for connecting the power to the machine or disconnecting it therefrom, which clutch or belt shifter is actuated from a treadle, the construction being such that when the treadle is moved in one direction or depressed the clutch or belt shifter is actuated to operatively connect the driving element to the machine. Many devices of this nature are so constructed that in order to keep the driving element clutched to the machine it is necessary for the operator to maintain the treadle depressed, for as soon as the pressure is released from the treadle the clutch or belt shifter will be automatically actuated to disconnect the driving element from the machine.

My present invention relates to a controlling mechanism of this general type and has for its objects to provide a novel controlling mechanism in which the shiftable element controlling the clutch belt shifter or other clutching means becomes automatically locked in its operative position when the treadle is depressed to connect the driving element to the machine thereby relieving the operator of the duty of maintaining the pressure on the treadle in order to maintain a driving connection between the driving element and the machine, and also to provide a construction whereby the lock may be released from the treadle when it is desired to disconnect the power element from the machine. The construction herein shown is such that movement of the treadle in one direction will throw the clutching element into operative position, in which position it becomes automatically locked and movement of the treadle in the opposite direction will automatically disengage the lock thereby allowing the clutching element to be released.

My invention is capable of use in connection with any machine and also might be used in connection with various types of clutching elements whether such clutching elements are in the nature of friction clutches or belt shifters, or have any other usual construction for clutching or connecting a driving element to a driven element.

In order to give an understanding of my invention I have illustrated in the drawings a selected embodiment thereof which will now be described, after which the novel features will be pointed out in the appended claims.

Figure 1 is a view showing a controlling mechanism embodying my invention; Fig. 2 is a view showing the device locked in its operative position; Fig. 3 is a section on the line 3—3, Fig. 2.

Inasmuch as the invention relates to the controlling mechanism by which the clutching device is rendered operative or inoperative and is capable of use with a great variety of machines, I have not illustrated herein any particular machine, but have merely shown at 1 the portion of the framework of a machine with which my improvement is used.

2 designates a shiftable element by the movement of which the driving or power element is clutched or operatively connected to the driven element of the machine 1. This shiftable element 2 may be in the form of a belt shifter for shifting a driving belt from a loose to a fast pulley and vice-versa, or it may be a clutch-controlling element by the movement of which a driving element is clutched to the driven element.

Inasmuch as the invention is capable of use with any of the ordinary clutch mechanisms or belt-shifting devices, I have not thought it necessary to illustrate any particular clutch mechanism herein, but have confined the illustration to the shiftable element 2 by which the belt shifter or clutch is actuated. This shiftable element 2 is shown as acted upon by automatically-operative means herein illustrated as a spring 3 by which it is normally moved into and retained in its inoperative position with the clutch or belt shifter disengaged. Movement of the shiftable element 2 to the left, Fig. 1 will effect the engagement of the clutch or will shift the belt from the loose to the fast pulley, thus setting the machine in operation.

The movement of the element 2 against the action of the spring is effected by a treadle 4 which is shown as pivoted at 5 to a stand or support 6. This treadle has a connection 7 secured thereto which connection is pivotally secured to an elbow-lever actuator 8 pivoted at 9 to the machine. The arm 10 of the lever 8 coöperates with a projection or lug 11 extending from the shiftable element 2. With this construction it will be seen that when the treadle is depressed to draw downwardly on the connection 7 the elbow-lever will be rocked into the position shown in Fig. 2, and the engagement of the arm 10 with the projection 11 will cause the shiftable element 2 to be moved to the left against the action of the spring 3 thereby connecting the driving element to the driven element of the machine.

As stated above, many treadle-operated controlling devices are so constructed that in order to maintain the shiftable element 2 in its operative position to keep the driving element of the machine in driving engagement with the driven element, it is necessary for the operator to maintain pressure on the treadle. This is sometimes a fatiguing operation because the pressure on the treadle has to be maintained against the action of the spring 3.

I have provided herein a novel construction whereby when the treadle 4 has been fully depressed thereby to fully shift the element 2 into its operative position, said element will become automatically locked in such position, thus relieving the operator of the necessity of continuing to hold the treadle depressed. The device is also so constructed that when the treadle is moved in the opposite direction the lock is released by such movement thereby permitting the shiftable element 2 to move into the position shown in Fig. 1. While various constructions adapted to accomplish this result may be employed I have designated for this purpose a simple device which includes a locking dog 12 pivoted at 13 to the elbow-lever 8, said dog having a notch 14 therein which is adapted to engage a locking member 15 secured to the frame. This locking dog 12 is acted upon by a suitable spring 16 carried by the elbow-lever 8, said dog and spring being so constructed that when the lever or actuator 8 moves from the position shown in Fig. 1 to that shown in Fig. 2, the notch 14 of the locking dog will automatically engage the locking member 15, thus locking the lever in its depressed position. When the elbow-lever 8 is thus locked the shiftable element 2 will be held in its operative position against the action of the spring even though the pressure is removed from the treadle 4, and thus the operator is relieved of the necessity of maintaining a pressure on the treadle sufficient to overcome the action of the spring 3.

In order to permit the lock to be released by a reverse movement of the treadle, I provide the locking dog 12 with the extension or tail portion 17 and provide a lost-motion connection between the connecting member 7 and the lever 8 so that movement of the treadle in said opposite direction will cause the connection member 7 to engage the tail of the locking dog and release it from locking engagement with the member 15. The upper end 18 of the connection 7 extends loosely through a trunnion member 19 mounted for turning movement in the lever 8, said connection having a head 20 at its upper end which engages the trunnion. The tail 17 of the locking dog 12 is situated over the end of the connection 7 so that when said connection is moved upwardly through the trunnion, the end thereof will engage the tail 17 and thereby release the locking dog from its locking engagement with the member 15.

It will thus be seen that a movement of the treadle 4 in one direction will swing the actuator 8 from the position shown in Fig. 1 to that shown in Fig. 2 thereby to shift the element 2 against the action of the spring 3 and that said actuator will become locked automatically in such position by the action of the locking-dog 12. When the treadle is moved in the opposite direction the connection 7 will be moved upwardly through the trunnion 19 until it strikes the tail 17 of the locking dog when said dog will be released from the member 15, thus allowing the shiftable element 2 to be moved to the right under the influence of the spring 3. It will thus be seen that with my invention the movement of the treadle in one direction will throw the shiftable element 2 to the left and will effect automatically the locking of said element in this position, while a movement of the treadle in the opposite direction will release the lock thereby permitting the shiftable element 2 to resume its initial position.

As stated above, the character of the shiftable element 2 may be varied without departing from the invention, that is, said element may be constructed to operate any usual device for operatively connecting a power or driving element to a driven element.

21 designates a stop formed on the actuator 8 and operating to limit the spring-impelled movement of the locking pawl.

I have herein shown the locking member 15 as adjustably mounted. For this purpose said locking member is provided with a screw-threaded stem 22 which is screw-threaded into a bracket 23 carried by the base of the machine 1, said stem being held in its adjusted position by a lock-nut 24.

The connection 7 is shown as formed of two sections 25 and 26 adjustably secured together by clamping collars 27. The purpose of this is to provide means for adjusting the length of the connection to suit machines that may be placed at different elevations from the floor on which the treadle 4 is mounted.

The connection 7 is herein shown as yieldingly connected to the treadle so as to provide a certain resiliency in the connection. The lower end of the connection 7 is provided with a ball-shaped head 28 which sets into a socket in an arm 29 extended from the treadle, and a spring 30 is situated between said arm and a collar 31 adjustably mounted on the connection 7.

While I have herein illustrated a selected embodiment of my invention I do not wish to be limited to the constructional features shown.

I claim:

1. In a controlling device, the combination with a shiftable element, of automatically-operative means to shift said element into one position, an actuator by which the element is shifted into another position, a lock for automatically locking said actuator in its operative position, a treadle, and connections between said treadle and actuator and lock whereby movement of the treadle in one direction shifts the actuator into its operative position and movement of the treadle in the other direction releases the lock.

2. In a device of the class described, the combination with a shiftable element, of automatically-operative means to shift it into one position, an actuator by which said element is shifted into another position against the action of said automatically-operative means, a treadle connected to said actuator by which it is operated, means to lock said actuator in its operative position, and means whereby said lock can be released by movement of the treadle.

3. In a device of the class described, the combination with a spring-actuated shiftable element, of an actuator by which said element is shifted against the action of the spring, an automatically-operative lock to lock said actuator in its operative position, a manually-operated device, and connections between said manually-operated device and actuator and lock whereby movement of said device in one direction will move the actuator into position to be locked and movement in the opposite direction will release the lock.

4. In a device of the class described, the combination with a spring-actuated shiftable element, of a pivoted actuator by which said element is moved against the action of the spring, a locking dog carried by said actuator, a treadle, and a connection between said treadle and actuator and dog whereby movement of the treadle in one direction operates the actuator and movement in the opposite direction releases the dog.

In testimony whereof, I have signed my name to this specification.

ELMER C. BASSETT.